Sept. 22, 1964    R. C. FINVOLD    3,150,363
SPACE VEHICLE DECOY DISCRIMINATION SYSTEM
Filed June 18, 1962    2 Sheets-Sheet 1
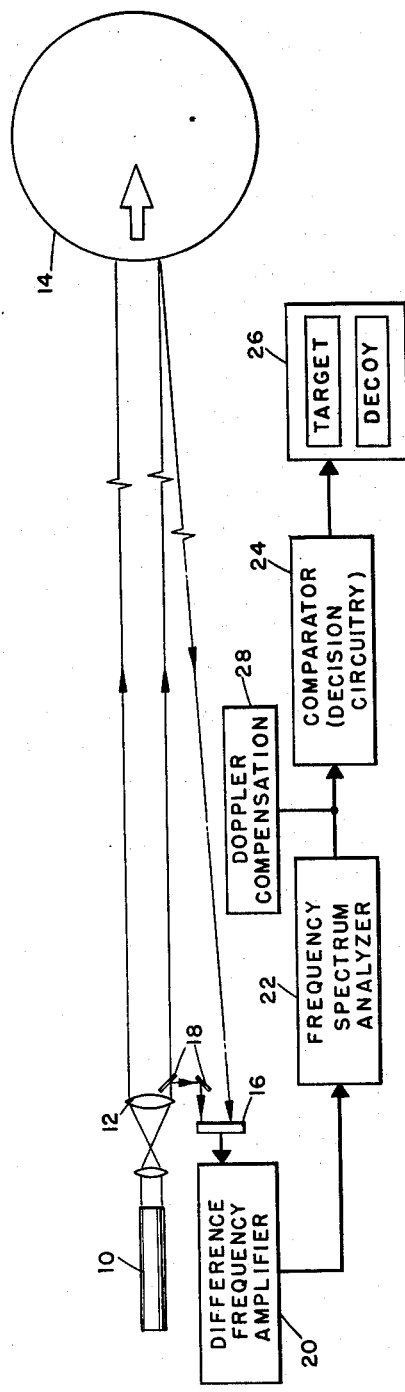
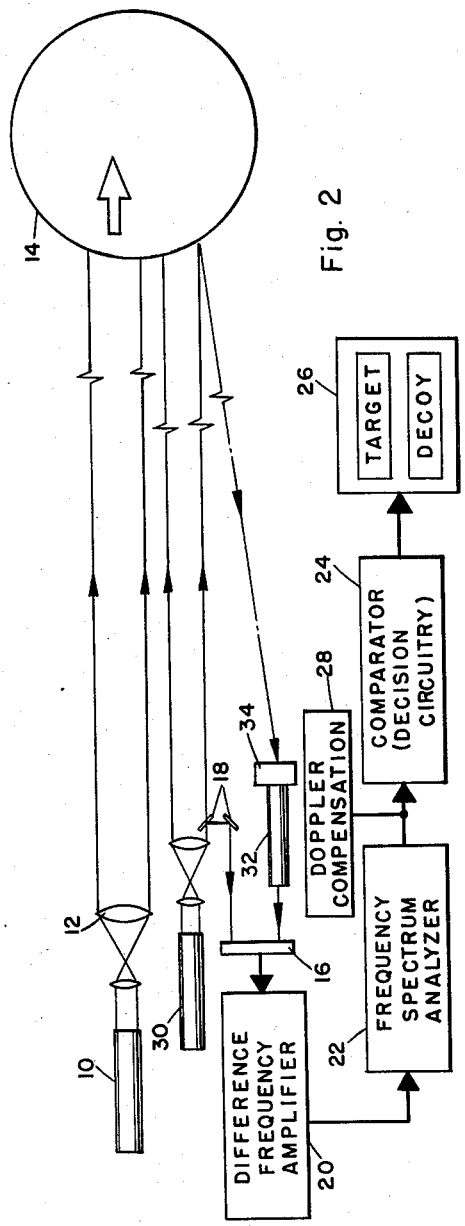
INVENTOR.
RODGER C. FINVOLD
BY
Knox & Knox

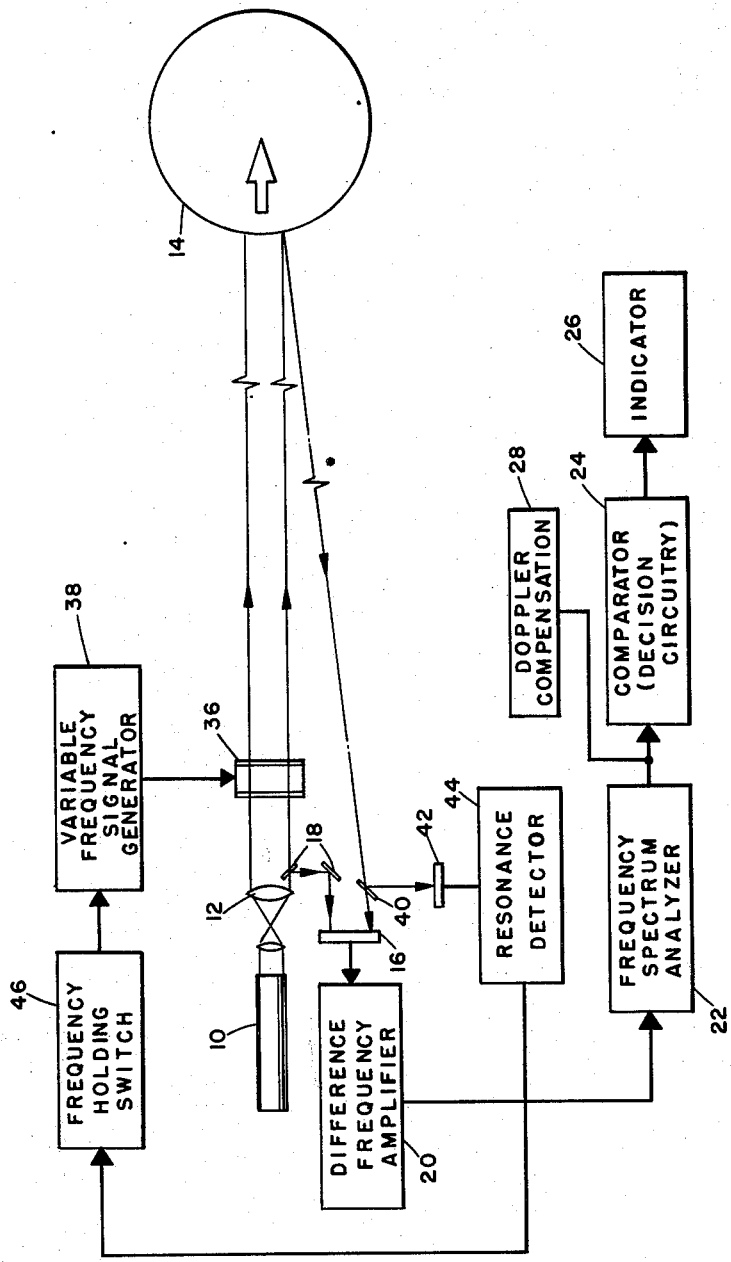

United States Patent Office 3,150,363
Patented Sept. 22, 1964

3,150,363
SPACE VEHICLE DECOY DISCRIMINATION SYSTEM
Rodger C. Finvold, San Diego, Calif., assignor to The Ryan Aeronautical Co., San Diego, Calif.
Filed June 18, 1962, Ser. No. 203,249
14 Claims. (Cl. 343—5)

The present invention relates generally to identification of objects by electromagnetic radiation and more particularly to a space vehicle decoy discrimination system.

In connection with long range ballistic missiles it has been proposed that numbers of decoys are ejected from or together with the warhead so that detection and tracking equipment is unable to determine which is the actual warhead. The concept is also applicable to orbital vehicles, such as observation satellites, or bombs which can be directed to a target on command, the idea being to protect the actual vehicle by confusing the detection equipment with multiple signals. For reasons of compactness, weight and costs, the decoys must be simple and are usually inflatable balloons with reflective coatings to provide proper return of radar signals. As a result, the decoys are of considerably less mass than the vehicle they are representing and can be deflected from their course by substantially less energy than that required to deflect the more massive vehicle, it being realized that very little energy is needed to change the course of an object in space.

The primary object of this invention, therefore, is to provide a system for discriminating between actual space vehicles, warheads of missiles, or the like and decoys or simulated objects used to confuse detection and tracking means, the system utilizing a source of electromagnetic radiation in the optical or near optical frequency range to illuminate a target, and means to analyze radiation reflected from the target, the changes in frequency of the reflected energy being compared with predetermined values to determine the physical nature of the target.

Another object of this invention is to provide a decoy discrimination system in which a high intensity radiation is obtained from an optical maser, the intensity being sufficient to cause actual deflection of the target, which can be readily detected.

With these and other objects definitely in view, this invention consists in the novel construction, combination and arrangement of elements and portions as will be hereinafter fully described in the specification, particularly pointed out in the claims, and illustrated in the drawings which form a material part of this disclosure, and in which:

FIGURE 1 is a diagram of one form of the basic system;

FIGURE 2 is a diagram of a modified system with low power monitoring means; and

FIGURE 3 is a diagram of a further modified system.

*Theoretical Considerations*

The system utilizes a source of electromagnetic radiation operating in the optical or near optical frequency range to illuminate a target, frequency changes in the radiation reflected from the target indicating the physical nature of the target. To be effective, the radiation must be frequency stabilized, preferably temporally coherent, so that small changes in frequency can be reliably determined. Also, the radiation must be of high intensity and concentrated in order to produce a physical deflection of the target at a considerable range. One means for providing such radiation is the optical maser, which has a coherent light output capable of being focused in an extremely narrow beam. Theoretically it is possible to restrict the divergence of the beam to much less than one second of arc, which means that virtually all of the radiated energy will strike a target of reasonable size, even at extremely long range. Further, the optical maser can be operated to provide an exceptionally high intensity output. Continuous output at a useful level can be obtained, short pulses of several kilowatts being possible with very short pulses on the order of several megawatts. When concentrated into the narrow beam the radiation pressure is considerable and will exert an actual thrust against any object illuminated by the beam. In free fall, a ballistic trajectory in space, or in an orbital path, where atmospheric drag is virtually non-existent, very little energy is necessary to deflect or change the course of an object. The radiation pressure obtainable from an optical maser will, in fact, cause a detectable shift of a target.

For example, a typical decoy comprising an inflated balloon with a reflective coating will weight approximately .01135 grams/cm.$^2$ and have an effective surface area of 7850 cm.$^2$. Assuming the radiation intensity to be 1000 watts per square meter and the entire adjacent face of the decoy surface illuminated, 0.1 watts/cm.$^2$ will be applied to the decoy. By established methods of calculation it can be determined that this energy will impart an effective acceleration of $2.9 \times 10^{-3}$ cm./sec.$^2$ to the decoy. At an optical wavelength of $.5 \times 10^{-4}$ cm. the resultant Doppler shift would be 120 c.p.s. for a black body and could be doubled for an object of high reflectivity. While the above values are approximate, it will be evident that detectable motions of a target are possible using radiation pressure at a practical energy level.

*Basic System*

Referring now to FIGURE 1 of the drawing, the apparatus includes a radiation source 10, specifically an optical maser, the output of which may be collimated as necessary by a suitable optical system 12. The specific configuration of the optical maser, its associated power supply and the optical system are subject to considerable variation and the details thereof do not form a specific part of the present disclosure. The radiant beam is directed at a target 14 and the reflected radiation is received by a detector 16, in this instance a photoelectric element. In addition, a portion of the transmitted radiation is directed, as by mirrors 18, to the detector 16, the output of which is fed to a difference frequency amplifier 20. The detector 16 and difference frequency amplifier 20 may take various forms. One particular configuration which has been demonstrated used a travelling wave tube having a photoemissive cathode, equivalent to detector 16. Two different frequencies of light were directed at the cathode and the travelling wave tube provided an amplified output of the difference frequency.

The radiation pressure of the beam against target 14 will cause an actual shift of the target, immediately accelerating it in the general direction of the thrust of the radiation, as indicated by the outlined arrow. The velocity change causes a Doppler shift in the frequency of the reflected radiation sensed by detector 16, the difference between the transmitted frequency and the reflected frequency being the output of amplifier 20. The difference frequency is fed through a frequency spectrum analyzer 22 to determine actual frequency and is applied to a comparator 24, which decides whether or not the target is a decoy. This is done by comparing the detected difference signal with predetermined frequency signals representing the Doppler shifts obtained from targets of known mass to area ratio. A target of high mass to area ratio will be affected less by radiation pressure than one of low mass, since more thrust is required to overcome the inertia of the mass. Thus a low mass target will provide a greater Doppler shift than a high mass target, due to the difference in acceleration resulting from the radiation pressure of the intercepting beam. By comparing the detected Doppler shift or difference frequency against a predetermined frequency representing the Doppler shift of a target of known mass to area ratio the nature of the specific target in terms of mass can be determined. For convenience, the comparator 24 can contain decision circuitry coupled to an indicator 26, which will give direct indication of the target as an actual target or a decoy.

Since the target 14 will normally have a motion relative to the radiation source 10 due to its travel in space, there will be an inherent Doppler shift in addition to that caused by radiation pressure. This Doppler shift will be substantially constant and can be readily determined from the measured velocity of the target at low instant radiation, the appropriate frequency compensation 28 being applied to the comparator 24, or to some other suitable point in the circuitry.

Various means are suitable for determining the velocity of a moving object, but this can be performed within the system as illustrated. An initial low energy signal can be transmitted from the radiation source 10 to illuminate the target 14 for a short period, so that the inherent Doppler shift due to motion can be determined and used as a compensation. Then the radiation source 10 is operated to provide a high intensity pulse of radiation which will produce the necessary deflection of the target to determine its nature from the further Doppler shift.

Modified Systems

The system illustrated in FIGURE 2 is basically similar to that described above, but contains a secondary low power radiation source 30 operating continuously as a monitor. The primary radiation source 10 is operated to cause deflection of the target with a high intensity pulse of radiation. However, instead of detecting the reflection of the short pulse of radiation, the Doppler shift is detected from the reflection of the low power monitor beam, which is equally affected by motion of the target. Since the reflection of low power radiation may be weak over long distances, the reflection can be detected by an optical maser receiver 32 which amplifies the signal. The frequency acceptance range of an optical maser is extremely small, so the receiver 32 must be provided with a tunable element 34 to adjust the frequency range for acceptance of the Doppler shifted frequency. Various means have been devised for tuning an optical maser, such as a variable electromagnetic field, or a variable pressure gas filter between the active maser element and one end reflector, the specific details not being significant in the present disclosure.

With the continuously operating monitor system, the radiation source 10 need not be an optical maser, since coherence of the radiation is no longer critical. Microwave or even particle beams may be suitable if sufficient power output can be obtained, but the optical maser does offer the advantages of high power and narrow, concentrated beam.

A further arrangement of the system is illustrated in FIGURE 3, utilizing the same basic configuration as previously described. However, the beam from radiation source 10 is modulated by means of a modulator 36 driven by a variable frequency signal generator 38. The modulator 36 may take the form of a Kerr cell, a piezoelectric crystal element, or some similar means capable of impressing modulation on an optical frequency carrier. The purpose of the variable frequency modulation is to find the natural resonant frequency of the target. Metallic structures, such as warheads or satellite vehicles, will have a resonant frequency very different from that of an inflated balloon and the resonance will cause modulation of the reflected radiation which can be detected and identified as produced by a particular type of structure. The Doppler shift detection system can be retained as before, but a portion of the reflected energy is diverted by a mirror 40 to a photoelectric element 42 coupled to a resonance detector 44 capable of handling the range of frequencies of signal generator 38. The resonance detector 44 is coupled to the signal generator 38 through a frequency holding switch 46 so that, when resonance of the target is detected, the resonance detector 44 provides an output to actuate switch 46 and lock the signal generator at that instantaneous frequency. This arrangement is somewhat comparable to a frequency tracking loop, well known in the microwave art, wherein a variable frequency signal is swept over a certain frequency range and can be held at any specific frequency. Once the resonant frequency of the target is found, the modulation of the radiant beam is thus held at that frequency and can be used repetitiously for confirmation or continued identification of the type of target. As an added feature, if sufficient power is available, the modulated high intensity radiation may be used to resonate the target strongly enough to cause damage or destruction.

The radiation source 10 can be scanned in a suitable pattern to locate a target, or may be coupled to and aimed by associated microwave apparatus of the seeker-tracker type. The scanning pattern and extent of scan will depend on the location of the apparatus, the nature of the target and on whether or not the course of the target is known to some extent. The apparatus can be ground based as a defensive system, or may be carried in an aircraft or space vehicle for offensive or defensive use.

It is understood that minor variation from the form of the invention disclosed herein may be made without departure from the spirit and scope of the invention, and that the specification and drawings are to be considered as merely illustrative rather than limiting.

I claim:
1. A method of discriminating between objects moving in space and decoys simulating the objects, comprising:
    transmitting a beam of electromagnetic radiation to an object with sufficient radiation pressure to deflect the object from its course by an amount dependent on its mass to area ratio;
    detecting radiation reflected from the object and determining the difference in frequency between the transmitted radiation and the reflected radiation;
    and comparing the difference frequency with a predetermined frequency representing the difference frequency received from an object of known mass to area ratio, thereby determining the relative mass and general physical nature of the object.

2. A method of discriminating between objects moving in space and decoys simulating the objects, comprising:
    transmitting a narrow beam of coherent electromagnetic radiation to strike an object with sufficient radiation pressure to deflect the object from its course by an amount dependent on its mass to area ratio;
    detecting radiation reflected from the object and determining the difference in frequency between the transmitted radiation and the reflected radiation;
    and comparing the difference frequency with a predetermined frequency representing the difference frequency received from an object of known mass to area ratio, thereby determining the relative mass and general physical nature of the object.

3. A method according to claim 2 wherein said coherent radiation is of substantially optical frequency.

4. A method of discriminating between objects moving in space and decoys simulating the objects, comprising:
    transmitting a beam of radiant energy to strike an object with sufficient intensity to cause motion of the object away from the source of the beam at a rate determined by its mass to area ratio;
    transmitting a beam of coherent electromagnetic radiation to strike the object at substantially lower intensity than the first mentioned beam;

detecting coherent radiation reflected from the object and determining the difference in frequency between the transmitted and reflected coherent radiation caused by motion of the object;

and comparing the difference frequency with a predetermined frequency representing the difference frequency received from an object of known mass to area ratio, thereby determining the relative mass and general physical nature of the object.

5. A method of discriminating between objects moving in space and decoys simulating the objects, comprising:

transmitting a beam of radiant energy to strike an object for a short period with sufficient intensity to cause motion of the object away from the source of the beam at a rate determined by its mass to area ratio;

transmitting a continuous beam of coherent electromagnetic radiation to strike the object at substantially lower intensity than the first mentioned beam;

detecting coherent radiation reflected from the object and determining the difference in frequency between the transmitted and reflected coherent radiation caused by motion of the object;

and comparing the difference frequency with a predetermined frequency representing the difference frequency received from an object of known mass to area ratio, thereby determining the relative mass and general physical nature of the object.

6. A method of discriminating between objects moving in space and decoys simulating the objects, comprising:

transmitting a beam of radiant energy to strike an object with sufficient intensity to cause motion of at least a part of the object;

detecting radiant energy reflected from the object and determining the frequency difference between the transmitted and reflected radiant energy due to motion of the object caused by the radiant energy;

and comparing the frequency difference with a predetermined frequency representing that received from comparable motion of an object of known characteristics, thereby determining the general physical nature of the object.

7. A method of discriminating between objects moving in space and decoys simulating the objects, comprising:

transmitting a high intensity beam of radiant energy to strike an object;

modulating the beam over a range of frequencies to cause resonance of at least a portion of the object;

detecting radiant energy reflected from the object and determining the frequency of the resonance therein;

and comparing the resonant frequency with predetermined resonant frequencies of objects of known characteristics, thereby determining the general physical nature of the object.

8. A method of discriminating between objects moving in space and decoys simulating the objects, comprising:

transmitting a high intensity beam of radiant energy to strike an object;

modulating the beam over a range of frequencies to cause resonance of at least a portion of the object;

detecting radiant energy reflected from the object and determining the frequency of the resonance therein;

comparing the resonant frequency with predetermined resonant frequencies of objects of known characteristics, thereby determining the general physical nature of the object;

and maintaining the modulation of the beam at the resonant frequency of the object with sufficient intensity to cause damage of the object by resonant vibration.

9. A system for discriminating between objects moving in space and decoys simulating the objects, comprising:

a source of radiant energy having means for transmitting a beam of energy to strike an object with sufficient intensity to move the object;

receiving means to detect radiant energy reflected from the object;

means to determine the difference in frequency between the transmitted and reflected radiant energy;

and means to compare the difference in frequency with predetermined frequencies of known characteristics, whereby the nature of the object can be determined.

10. A system for discriminating between objects moving in space and decoys simulating the objects, comprising:

a source of radiant energy having means for transmitting a beam of energy to strike an object with sufficient intensity to move the object;

modulating means to modulate the beam of radiant energy in a range of frequencies capable of resonating at last a portion of the object;

receiving means to detect radiant energy reflected from the object;

means to determine the difference in frequency between the transmitted and reflected radiant energy;

and means to compare the difference in frequency with predetermined frequencies of known characteristics, whereby the nature of the object can be determined.

11. A system for discriminating between objects moving in space and decoys simulating the objects, comprising:

a source of radiant energy having means for transmitting a beam of energy to strike an object with sufficient intensity to move the object;

modulating means to modulate the beam of radiant energy in a range of frequencies capable of resonating at least a portion of the object;

receiving means to detect radiant energy reflected from the object;

means to determine the difference in frequency between the transmitted and reflected radiant energy;

means to compare the difference in frequency with predetermined frequencies of known characteristics, whereby the nature of the object can be determined;

means to identify the most effective frequency of the said range of frequencies which causes resonance of the object;

and means coupled between said last mentioned means and said modulating means to subsequently maintain the modulation at the said most effective frequency.

12. A system for discriminating between objects moving in space and decoys simulating the objects; comprising:

a source of electromagnetic radiation having means for transmitting a beam of radiation to strike an object with sufficient intensity to move the object away from said source;

receiving means to detect radiation reflected from the object;

means to determine the difference in frequency between the transmitted and received radiation;

and means to compare the difference in frequency with predetermined frequencies of known characteristics, whereby the nature of the object can be determined.

13. A system for discriminating between objects moving in space and decoys simulating the objects; comprising:

a source of electromagnetic radiation having means for transmitting a beam of radiation to strike an object with sufficient intensity to move the object away from said source;

a source of coherent electromagnetic radiation of low intensity having means to transmit a continuous beam to strike the object;

receiving means to detect coherent radiation reflected from the object;

means to determine the difference in frequency between the transmitted and reflected coherent radiation;

and means to compare the difference in frequency with predetermined frequencies of known characteristics, whereby the nature of the object can be determined.

14. A system for discriminating between objects moving in space and decoys simulating the objects, comprising:

a source of coherent electromagnetic radiation substantially in the optical frequency range having means to transmit a narrow beam to strike an object with sufficient radiation pressure to move the object away from said source;

receiving means to detect radiation reflected from the object;

means to determine the difference in frequency between the transmitted and received radiation;

and means to compare the difference in frequency with predetermined frequencies of known characteristics, whereby the nature of the object can be determined.

No references cited.